(12) United States Patent
Hintz

(10) Patent No.: US 8,167,979 B2
(45) Date of Patent: May 1, 2012

(54) HIGH EFFICIENCY, NON-TOXIC SCRUBBING SYSTEM AND METHOD FOR REMOVING CARBON DIOXIDE FROM A GAS

(75) Inventor: Christopher J. Hintz, Savannah, GA (US)

(73) Assignee: University of South Carolina, Columbia, SC (US)

( * ) Notice: Subject to any disclaimer, the term of this patent is extended or adjusted under 35 U.S.C. 154(b) by 411 days.

(21) Appl. No.: 12/430,467

(22) Filed: Apr. 27, 2009

(65) Prior Publication Data

US 2009/0320683 A1 Dec. 31, 2009

Related U.S. Application Data

(60) Provisional application No. 61/133,517, filed on Jun. 30, 2008.

(51) Int. Cl.
*B01D 53/14* (2006.01)
*B01D 53/18* (2006.01)

(52) U.S. Cl. ............... 95/199; 95/226; 95/236; 96/279; 96/351

(58) Field of Classification Search ............ 95/185, 95/236, 226, 199; 96/275, 329, 351–354, 96/278–279
See application file for complete search history.

(56) References Cited

U.S. PATENT DOCUMENTS

| 4,073,863 | A | * | 2/1978 | Giammarco et al. | 423/222 |
| 4,146,569 | A | * | 3/1979 | Giammarco et al. | 423/222 |
| 4,271,132 | A | * | 6/1981 | Eickmeyer | 423/223 |
| 4,363,639 | A | * | 12/1982 | Gladon | 95/226 |
| 7,459,012 | B2 | * | 12/2008 | Davis et al. | 95/235 |
| 7,628,847 | B2 | * | 12/2009 | Pope et al. | 96/242 |

* cited by examiner

*Primary Examiner* — Duane Smith
*Assistant Examiner* — Ives Wu
(74) *Attorney, Agent, or Firm* — Dority & Manning, P.A.

(57) ABSTRACT

Scrubbing systems and methods for removing carbon dioxide from a gas are provided. The scrubbing system can include a scrubber defining a vertically oriented tubing assembly, a gas inlet and a gas outlet. The tubing assembly has a tank section, a reduced diameter section, and an expansion section such that the expansion section is positioned above the reduced diameter section and the reduced diameter section is positioned above the tank section. An aqueous liquid-phase scrubbing media is contained within the tank section. The scrubbing system can further include a water bath configured to receive the $CO_2$-free gas exiting the scrubber.

23 Claims, 5 Drawing Sheets

HIGH EFFICIENCY, NON-TOXIC SCRUBBING SYSTEM AND METHOD FOR REMOVING CARBON DIOXIDE FROM A GAS

PRIORITY INFORMATION

The present application claims priority to U.S. provisional patent application Ser. No. 61/133,517 filed on Jun. 30, 2008 entitled "High Efficiency, Non-Toxic Scrubber for Removing Carbon Dioxide from Atmospheric Air", the disclosure of which is incorporated by reference herein.

GOVERNMENT SUPPORT CLAUSE

The present invention was developed with funding from the National Science Foundation under award OCE 0647891. Therefore, the government retains certain rights in this invention.

BACKGROUND OF THE INVENTION

As anthropogenic $CO_2$ raises daily from the massive use of fossil fuels to provide energy for our world population, researchers are becoming increasingly interested in the effects $CO_2$ has on the environment. Of particular concern is the removal of $CO_2$ from the atmosphere as it dissolves into the world's oceans. This process is acidifying the world's oceans, as dissolved $CO_2$ quickly reacts with water to form carbonic acid. How this global ocean acidification is going to impact the biota in the ocean is largely unknown.

Researchers at major universities are utilizing a variety of laboratory and small-scale experiments to explore the biological effects of ocean acidification. The sheer magnitude of the problem, and scarce financial resources to conduct large-scale oceanic sampling, limits the experimental abilities of most scientists. Thus the laboratory approach is a more economical and practical for experimenting with biota which can be maintained in seawater cultures.

One confounding difficulty with experimenting with $CO_2$ effects is that $CO_2$ in the atmosphere naturally varies by season. Photosynthesis during the summer and fossil fuel burning during the winter in the northern hemisphere drive atmospheric $CO_2$ lower and higher by 20-30 ppm. Thus, any experiment that must maintain $CO_2$ concentration for long periods of time must utilize compressed Air/$CO_2$ mixtures or otherwise attempt to overcome the seasonal fluctuation. Moreover, attempting to replicate pre-industrial revolution atmospheric values must use compressed Air/$CO_2$ mixtures. Compressed gases have two detractors: they are reasonably expensive when utilizing large volumes of air that are typically required for healthy culturing, and their stable isotopic fraction is rarely consistent. This severely limits the scope of biogeochemical experimentation for simulating past or future ocean chemistries.

Commonly-used $CO_2$ caustic scrubbers ($CO_2$—CS) utilize acid-base chemistry to remove $CO_2$ from air streams. These $CO_2$—CS scrubbers use a solid phase scrubber media. Unfortunately, the chemical reaction that must take place to remove atmospheric $CO_2$ requires water. While humid air streams can provide some of this water, it often cannot provide enough to fully remove the atmospheric $CO_2$ at high flow rates. Thus, the scrubber looses efficiency by not effectively converting $CO_2$ to carbonic acid, which is then neutralized by the caustic scrubbing media. Further, atmospheric humidity is rarely constant, causing unacceptable changes in $CO_2$—CS scrubber efficiencies. Sprayed water additions can also be used, but even the coating of the water on each of the solid media surfaces is difficult. The capacity of this volume of water is ultimately saturated with the removed $CO_2$ and scrubber breakthrough occurs long before the caustic media is fully neutralized by $CO_2$. The water is still the limiting reactant.

As such, a need exists for a more efficient and consistent $CO_2$ scrubbing system. In addition, to address the experimental shortcomings described above, a system for the stringent control of the partial pressure of $CO_2$ ($pCO_2$) in culture aeration and seawater has been developed.

SUMMARY OF THE INVENTION

Objects and advantages of the invention will be set forth in part in the following description, or may be obvious from the description, or may be learned through practice of the invention.

In general, the present disclosure is directed toward scrubbing systems and methods for removing carbon dioxide from a gas. For example, a scrubbing system according an exemplary embodiment can include a scrubber defining a tubing assembly that is vertically oriented, a gas inlet and a gas outlet. The tubing assembly has a tank section, a reduced diameter section, and an expansion section such that the expansion section is positioned above the reduced diameter section and the reduced diameter section is positioned above the tank section. An aqueous liquid-phase scrubbing media (e.g., a caustic metallic base) is contained within the tank section. The scrubber can be configured such that the gas is introduced to the aqueous liquid-phase scrubbing media via the gas inlet to allow the aqueous liquid-phase scrubbing media to remove $CO_2$ from the gas forming a $CO_2$-free gas. Additionally, the scrubber can be configured such the $CO_2$-free gas exits the scrubber via the gas outlet. In one embodiment, the scrubbing system can further include a water bath configured to receive the $CO_2$-free gas exiting the scrubber.

To remove carbon dioxide from a gas according to an exemplary method of the present invention, the gas can be introduced to a scrubbing system via a gas inlet such that the gas passes through the gas inlet and into a tubing assembly containing an aqueous liquid-phase scrubbing media in a tank section. The gas can then be bubbled through the aqueous liquid-phase scrubbing media to form a $CO_2$-free gas in a headspace defined by the tubing assembly. Then, the $CO_2$-free gas passes through the reduced diameter section and the expansion section, and is removed from the scrubber via the gas outlet. The $CO_2$-free gas can then be piped from the gas outlet to a water bath, and bubbled through the water bath.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1A:
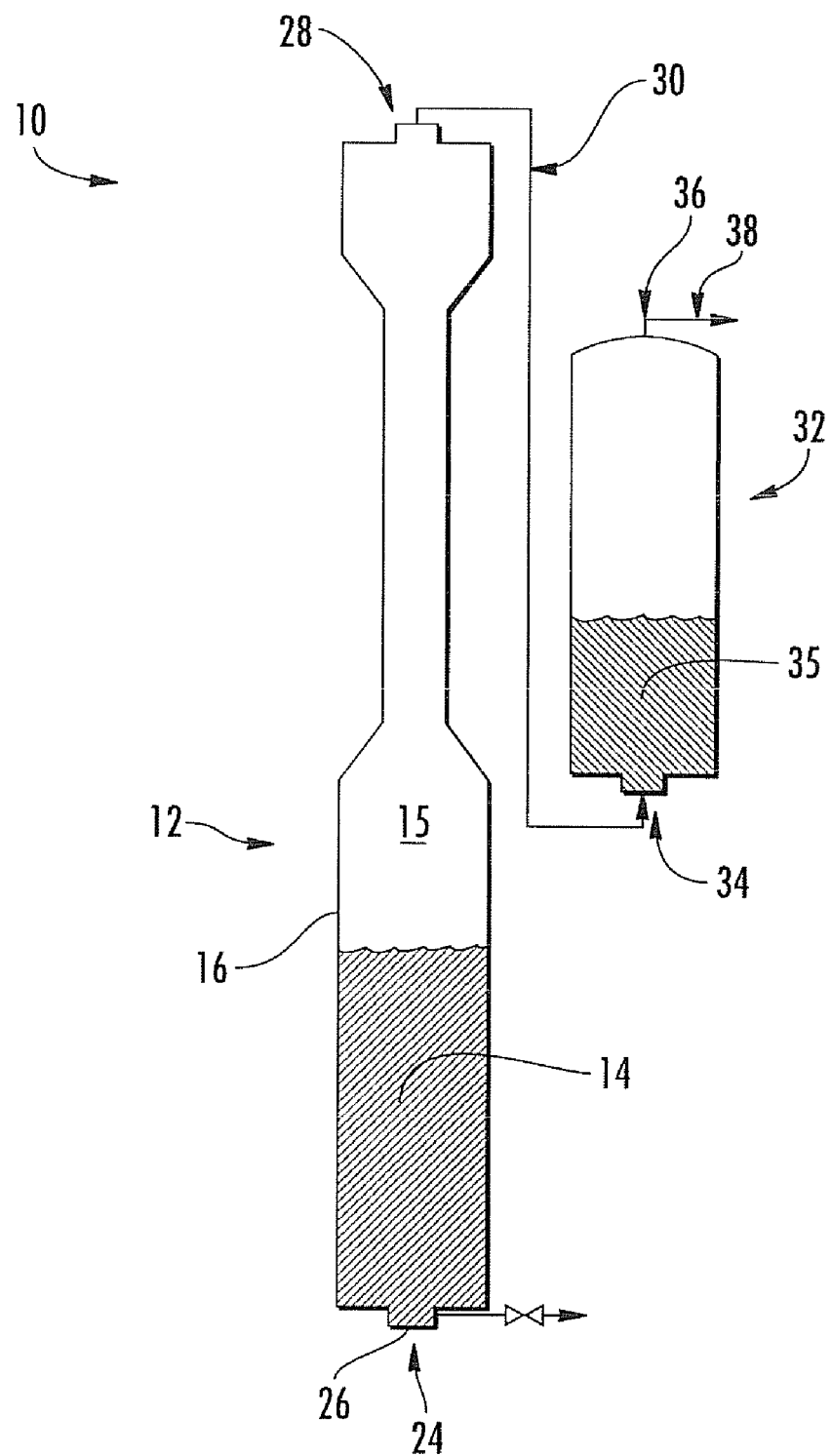
FIG. 1A shows a schematic drawing of an exemplary high-efficiency $CO_2$ scrubbing system 10.

Repeat use of reference characters in the present specification and drawings is intended to represent the same or analogous features or elements of the present invention.

DETAILED DESCRIPTION OF THE INVENTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Generally speaking, the present disclosure is directed to a high-efficiency and non-toxic $CO_2$ scrubbing system configured to remove the variable $CO_2$ in atmospheric air. The scrubbing system of the present invention utilizes a liquid scrubbing media configured to remove $CO_2$ from a gas bubbled through the scrubbing media to form a $CO_2$-free gas. This $CO_2$-free gas can be mixed with compressed gaseous $CO_2$ to experimentally maintain any desired aeration $CO_2$ mixture. For example: $CO_2$ concentrations in air can be formed to mimic pre-industrial conditions (e.g., from about 150 ppm to about 280 ppm), current day conditions (e.g., from about 320 ppm to about 380 ppm), or projected future conditions (e.g., from about 700 ppm to about 2000 ppm) $CO_2$ concentrations. Further, the natural biological processes in the deep-sea create high-$CO_2$ regions (e.g., from about 1000 ppm to about 1500 ppm) in the deep Pacific, which may also be simulated with this system. Regardless of the $CO_2$ concentrations formed, the resulting concentration can be regulated as desired (e.g., kept substantially constant, etc.).

The use of an aqueous liquid-phase scrubbing media allows the necessary chemical reactants to be available so that the chemical exchange between the inputted gas (e.g., environmental air) and scrubbing media is rapid, achieving high efficiency at high aeration flow rates.

A. Aqueous Liquid-Phase Scrubbing Media

Since the presently disclosed $CO_2$ scrubbing system utilizes an aqueous liquid-phase scrubbing media, the chemical reaction required to remove $CO_2$ from the gas is not limited by the availability of water in the air. As such, a particular air stream humidity is not required, and is actually maintained at 100% relative humidity throughout the scrubbing process. This advantage is particularly beneficial for aquaculture processes that desire to bubble the experimental air into aquatic systems by minimizing changes in salinity (for marine systems), or other dissolved constituents. Moreover, bubbling gas through the liquid media, particularly bubbling small bubbles that have high-surface-area-to-volume ratios, can improve the removal of $CO_2$ from the air stream due to the improved contact between the particles in the gas and the liquid media (when compared to a solid-phase media).

The scrubbing media utilizes acid-base neutralization chemistry to remove $CO_2$ from the gas. Thus, the scrubbing media is formed from a base (e.g., a strong base) dissolved in water so that the scrubbing media is any strongly basic solution. Particularly suitable strong bases include, but are not limited to, caustic metallic bases such as sodium hydroxide (NaOH), calcium hydroxide ($Ca(OH)_2$), potassium hydroxide (KOH), barium hydroxide ($Ba(OH)_2$), cesium hydroxide (CsOH), strontium hydroxide ($Sr(OH)_2$), lithium hydroxide (LiOH), rubidium hydroxide (RbOH), magnesium hydroxide ($Mg(OH)_2$), and mixtures and combinations thereof. In one particular embodiment, the scrubbing media can include sodium hydroxide and/or calcium hydroxide, since these compounds are relatively non-toxic and efficiently remove carbon dioxide from the atmospheric air stream.

When the $CO_2$ containing gas is bubbled through the scrubbing media, the $CO_2$ dissolves in the aqueous solution to form carbonic acid according to the formula:

$$CO_2 + H_2O \rightleftharpoons H_2CO_3$$

Once carbonic acid forms from the $CO_2$ present in the gas, it is quickly neutralized by the strong base dissolved in the scrubbing media, converting the carbonic acid to carbonate and bicarbonate:

$$H_2CO_3 \rightleftharpoons HCO_3^- + H^+ \text{ and } HCO_3^- \rightleftharpoons CO_3^{2-} + H^+$$

The presence of the strong base in the scrubbing media forces the equilibriums of these equations towards the formation of carbonate ($HCO_3^-$) and bicarbonate ($CO_3^{2-}$), which will remain in the solution due to the presence of the strong base. In particular, the excess hydroxyl ions (OH⁻) in the scrubbing media forces the equilibriums of these equations towards the formation of carbonate ($HCO_3^-$) and bicarbonate ($CO_3^{2-}$).

The concentration of the strong base in the scrubbing media is sufficient to allow removal of $CO_2$ from the bubbled gas. For example, the total molar caustic metal base in the scrubbing media can determine the scrubber's capacity to remove $CO_2$. The initial concentration of total caustic metal base appears to determine the scrubber efficiency up to about 1M, but a concentration greater than 1M yields no improvement. Thus, an initial concentration of about 1M of caustic metal base can maximize the removal of $CO_2$.

For example, a 1 M [OH⁻] mixture of sodium and calcium hydroxide (90-95% by mole NaOH, with the balance being $Ca(OH)_2$) can be utilized. 3 L of 1M scrubbing media mixture has the capacity for typical atmospheric $CO_2$ removal for nine days of continuous aeration at 3 L min⁻¹. Efficiency of this scrubbing unit can be over 99.8% $CO_2$ removal at 3 L min⁻¹ air flow rate.

Other additives may also be present in the scrubbing media. For example, anti-surfactants can be present to prevent the media from bubbling. pH indicators can also be present to provide a visual indication of scrubber capacity.

The use of acid-base neutralization chemistry allows for recovery of the starting materials. Specifically, the scrubbing media used in the presently disclosed scrubbing system can be regenerated after use, in whole or in part, through release of the removed acidic atmospheric pollutants with subsequent acid-base pH manipulations of the scrubbing media. For example, the addition of hydrogen ions (H+) to the carbonate salt can change the equilibrium of the equation, releasing $CO_2$. Using sodium bicarbonate as an example, the reaction would occur according to the following:

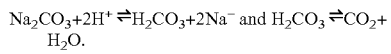

$$Na_2CO_3 + 2H^+ \rightleftharpoons H_2CO_3 + 2Na^- \text{ and } H_2CO_3 \rightleftharpoons CO_2 + H_2O.$$

Although the present disclosure focuses on the removal of $CO_2$ from a gas, the scrubbing system can also remove at varying efficiencies any water-soluble acidic pollutant (e.g., $NO_X$, $SO_X$, and the like).

B. Scrubbing System

The liquid-phase scrubbing media of the scrubbing system is utilized through a specially designed scrubber to maximize air contact with the scrubbing media, so that the $CO_2$ is quickly removed from the bubbled gas. Additionally, the scrubber can be configured to reduce the amount of entrained scrubbing media in the gas after bubbling through the scrubbing media.

Referring to FIG. 1A, an exemplary scrubbing system 10 is generally shown. The scrubbing system 10 includes a scrubber 12 holding the scrubbing media 14 contained within its tubing assembly 16. The tubing assembly 16 can be constructed from any material that is non-reactive to the scrubbing media and can withstand the elevated pressure within the tubing assembly 16. These materials include, but are not limited to, polymeric materials (e.g., polyvinyl chloride (PVC), polypropylene, polycarbonate, and fluorinated polymers (e.g., Teflon™), metallic materials (e.g., non-reactive stainless steel), etc. The tubing assembly 16 forming the scrubber 12 can be a single piece of tubing material, or a plurality of pieces of tubing material connected and fitted together. The shape of the tubing assembly 16 is shown to be cylindrical (outside of the diameter changes described below). However, the tubing assembly 16 can be formed into any other suitable shape.

The gas stream (e.g., atmospheric air) is introduced into the scrubber 12 through a gas inlet 24. In one particular embodiment, the gas inlet 24 includes a fine air stone 26. As the gas stream passes through the fine air stone 26 in the gas inlet 24, very small air bubbles are formed so that the gas stream can increase contact with the scrubbing media. The small air bubbles have high surface-area-to-volume ratios (SAN) to maximize the transfer of gaseous $CO_2$ into the liquid phase scrubbing media 14.

The scrubber 12 is shaped so that the inputted gas passes from the gas inlet 24 through the scrubbing media 14 and into the headspace 15. In use, an elevated pressure inside scrubber 12 (i.e., in the headspace 15 above the scrubbing media 14) can be formed. This elevated pressure helps control the gas flow after the scrubber has removed the $CO_2$. For example, the pressure inside the tubing assembly can be from about 100 kPa to about 500 kPa, such as from about 150 kPa to about 300 kPa. In one particular embodiment, the pressure inside the tubing assembly can be from about 175 kPa to about 275 kPa.

The length of time that the air bubbles are in the scrubbing media 14 (i.e., the "residence time") can be controlled by the pressure in the headspace 15, with longer residence times allowing for more efficient $CO_2$ removal from the gas. Residence time is the length of time for the inputted gas to pass through the scrubber media. A minimum residence time is required to allow for the atmospheric $CO_2$ to dissolve into the scrubbing medium and become neutralized. This minimum time can vary according to the volume of scrubbing media 14 present in the scrubber 12, the height of the tank section 18, the concentration the caustic metal base in the scrubbing media, the concentration of $CO_2$ in the inputted gas, the temperature of the scrubbing media, and other variables. However, in most applications, it is desirable for the inputted gas (e.g., atmospheric air) to have a residence time of greater than 10 seconds in the scrubbing media 14, such as from about 20 seconds to about a minute, to ensure maximum efficiency of the scrubbing system 10.

Vigorous bubbling of the inputted gas through the scrubbing media 14 entrains some of the scrubbing media into the air stream. Thus, the headspace 15 of the scrubber 12 is configured to reduce the amount of entrained scrubbing media in the $CO_2$-free gas exiting the scrubber 12.

Figure 1B:
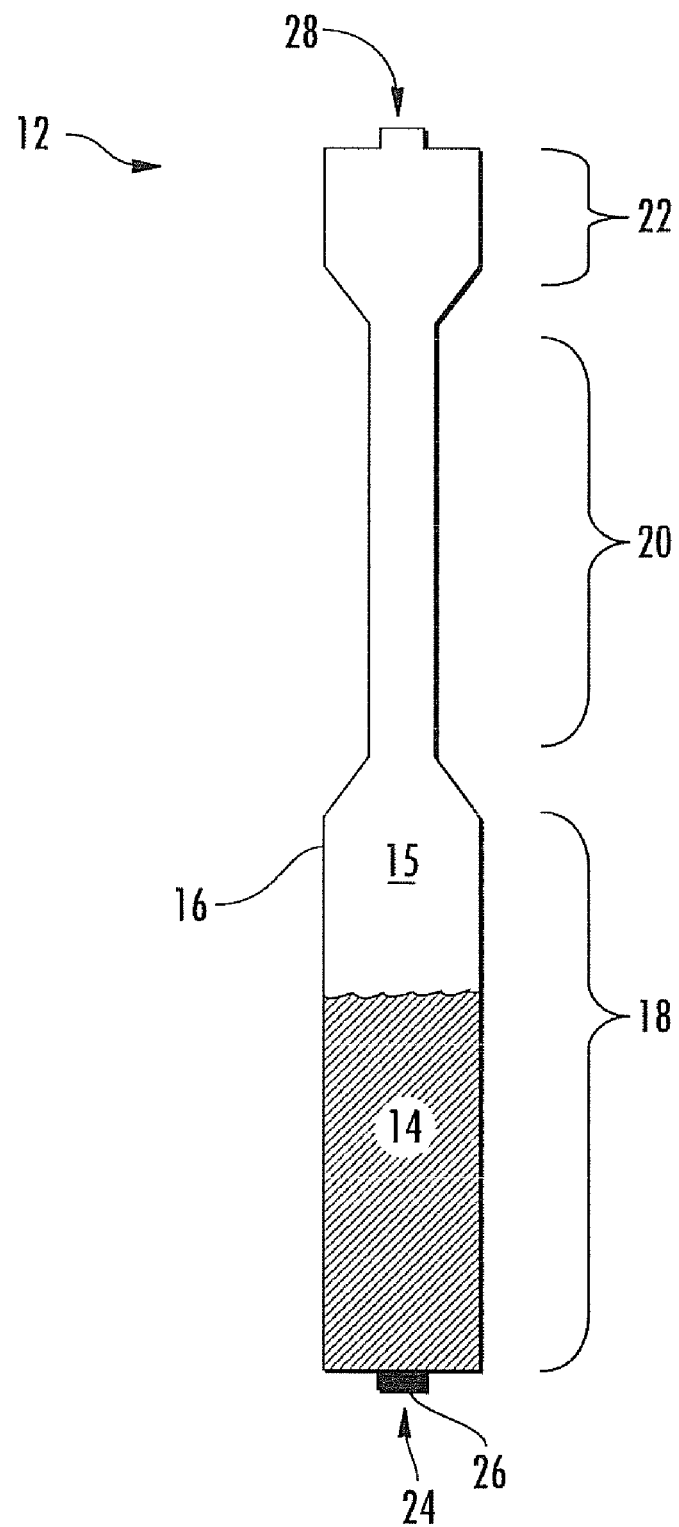
FIGS. 1B and 1C shown exemplary embodiments of scrubbers 12 for use in the scrubbing system.
Figure 1C:
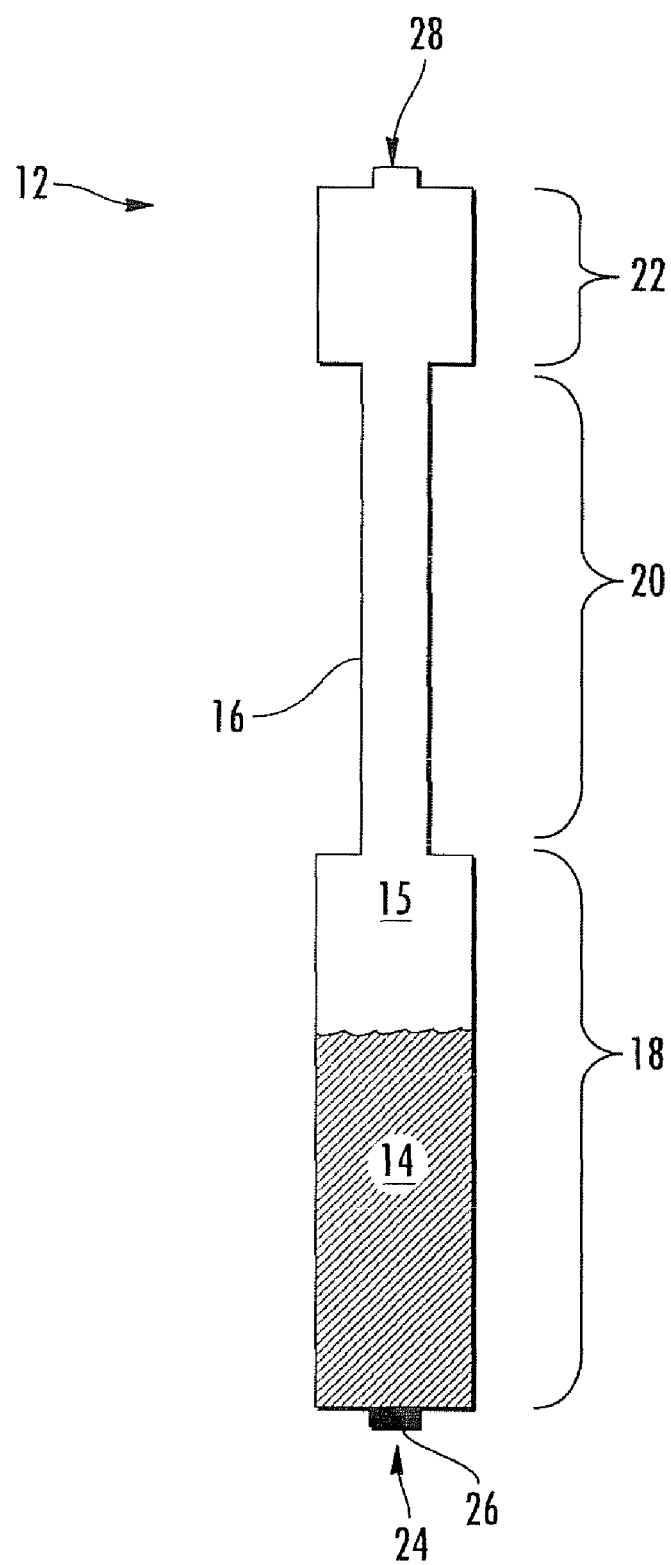

Specifically, a restriction and tall headspace 15 is used in the scrubber 12 to help remove entrained scrubbing media in the quickly moving air leaving the scrubber 12. FIGS. 1B and 1C show the scrubber 12 of the exemplary scrubbing system 10 of FIG. 1A. The scrubber 12 defines a tank section 18 holding the scrubbing media 14. The volume of scrubbing media 14 in the scrubber 12 can be adjusted such that the scrubbing media 14 occupies from about 5% to about 95% of the height of the tank section 18, such as from about 30% to about 75% of the height of the tank section 18.

A reduced diameter section 20 is positioned above the tank section 18 such that the gas passing through the scrubbing media 14 and headspace 15 must pass through this reduced diameter section 20. The reduced diameter section 20 is followed by an expansion section 22 installed above the reduced diameter section 20 and the tank section 18 scrubbing media liquid surface. Forcing the air stream through a restriction (e.g., the reduced diameter section 20) then expansion (e.g., expansion section 22) provides an obstruction for entrained scrubber media to hit and a surface upon which the entrained scrubber media can condense. Additionally, the rapid reduction is velocity of the gas particles associated with the expansion (upon traveling from the reduced diameter section 20 to the expansion section 22) can cause vortices that result in additional contact time along the walls of the scrubber for entrained scrubber media to hit and condense.

In one embodiment, the reduced diameter section 20 has a diameter that is less than 90% of the diameter of the tank section 18 and/or the expansion section 22, such as from about 10% to about 85%. In particular embodiments, the reduced diameter section 20 has a diameter that is from about 25% to about 75% of the diameter of the tank section 18 and/or the expansion section 22. However, diameters of each stage of the scrubber 12 can vary as long as they are not too restrictive to air flow.

In one particular embodiment, the height of the tank section 18 can be approximately twenty inches and can have a diameter of about four inches. The reduced diameter section 20 and the expansion section 22 can combine for a height of about twenty inches (about ten inches for each of the reduced diameter section 20 and the expansion section 22). The reduced diameter section 20 can have a diameter of about two (2) inches (which is 50% of the diameter of the tank section 18). The expansion section 22 can have a diameter of about four inches, which is substantially equal to the diameter of the tank section 18. The foregoing sizes and dimensions are given only as an example and can vary depending upon the application.

The change in diameters from the tank section 18 to the reduced diameter section 20 and from the reduced diameter section 20 to the expansion section 22 can be gradual, as shown in FIGS. 1A and 1B. Alternatively, the change in diameters from the tank section 18 to the reduced diameter section 20 and from the reduced diameter section 20 to the expansion section 22 can be immediate, as shown in FIG. 1C.

Thus, the configuration of the tubing assembly 16 can remove the entrained scrubbing media from the air stream as it passes from the scrubbing media 14 through the headspace 15 to minimize caustic transfer out of the scrubber. Additionally, coarse or fine mesh screens (not shown), made of similar inert materials, can also be installed in the headspace 15 and/or at the gas outlet 28 to help removed entrained caustic water droplets.

The $CO_2$-free air exiting the scrubber 12 passes through pipe 30 to a deionized (DI) water bath 32. The deionized water bath 32 removes any remaining entrained scrubbing media in the $CO_2$-free air stream to provide a clean $CO_2$-free gas. The exemplary deionized water bath 32 shown in FIG. 1A includes a $CO_2$-free gas inlet 34 that introduces the $CO_2$-free gas to the deionized water bath 32. The $CO_2$-free gas passes from the $CO_2$-free gas inlet 34, through the water 35, and out of the deionized water bath 32 through the $CO_2$-free gas outlet 36. The deionized water bath 32 can be approximately fifteen (15) inches in height and about four (4) inches in diameter, in one exemplary embodiment, though exact dimensions can change as desired according to the application of use. The clean $CO_2$-free gas can be piped, via pipe 38, to any desired location (e.g., a holding tank).

The scrubbing system 10 can remove greater than 99% of the $CO_2$ from the inputted gas. For example, from about 99.5% to about 99.99%, such as from about 99.7 to about 99.95%, of the $CO_2$ can be removed from the inputted gas. Thus, the efficiency of the scrubbing system 10 is extremely high for the removal of $CO_2$ from a gas. The $CO_2$-free gas provided by the scrubbing system 10 can contain less than about 1 ppb $CO_2$. In certain embodiments, the measurement of the $CO_2$-free gas provided by the scrubbing system 10 can contain a negligible amount (e.g., about 0 ppm).

The scrubbing media 14 needs to be refreshed periodically to sustain efficient $CO_2$ removal. For the experimental development described below, the scrubbing system was designed to operate continuously for 1 week operation at 3 L min$^{-1}$. The frequency of change can be scaled upwards if necessary. Additionally, the DI water bath can also be changed regularly basis to avoid any buildup of base in the water.

C. Experimental Use of the Scrubbing System

Applications and uses of the presently disclosed scrubbing system can include research purposes (e.g., controlling $CO_2$ concentrations for experimental purposes); commercial or industrial applications for biological processes, and/or limited applications for one time non-regenerative uses.

Any amount of $CO_2$ can be added to this $CO_2$-free air source to supply a realistic or experimental $CO_2$/air mixture to laboratory cultures.

EXAMPLE

For laboratory development, a mixture of sodium hydroxide and calcium hydroxide was utilized. Specifically, a 1 M [OH$^-$] mixture of sodium and calcium hydroxide (90-95% by mole NaOH, balance Ca(OH)$_2$) was formed as the scrubbing media. 3 L of this scrubbing media was placed into a large vertical scrubber, such as shown in FIGS. 1A and 1B, constructed of a PVC tubing assembly. The height of the tank section 18 was approximately twenty inches and had a diameter of about four inches. The reduced diameter section 20 and the expansion section 22 combined for a height of about twenty inches (about ten inches for each of the reduced diameter section 20 and the expansion section 22). The reduced diameter section 20 had a diameter of about two inches. The expansion section 22 had a diameter of about four inches. The deionized water bath 32 was about fifteen inches in height and had a diameter of about four inches. 3 L of 1M scrubbing media mixture has the capacity for typical atmospheric $CO_2$ removal for nine days of continuous aeration at 3 L min$^{-1}$. Efficiency of this scrubbing unit is over 99.8% $CO_2$ removal at 3 L min$^{-1}$ air flow rate.

Several trials were conducted to evaluate the removal efficiency and breakthrough time of the $CO_2$ scrubber (Table 1). Atmospheric air was bubbled through the $CO_2$ scrubber and the input and output p$CO_2$ was monitored. Efficiency was determined by calculating the reduction in p$CO_2$ in the output stream compared to the input stream p$CO_2$. Scrubber parameters such as airflow rate, residence time ($\tau$), total caustic (OH$^-_T$), caustic concentration ([OH$^-$]), were varied to identify their affect on efficiency.

Figure 2:
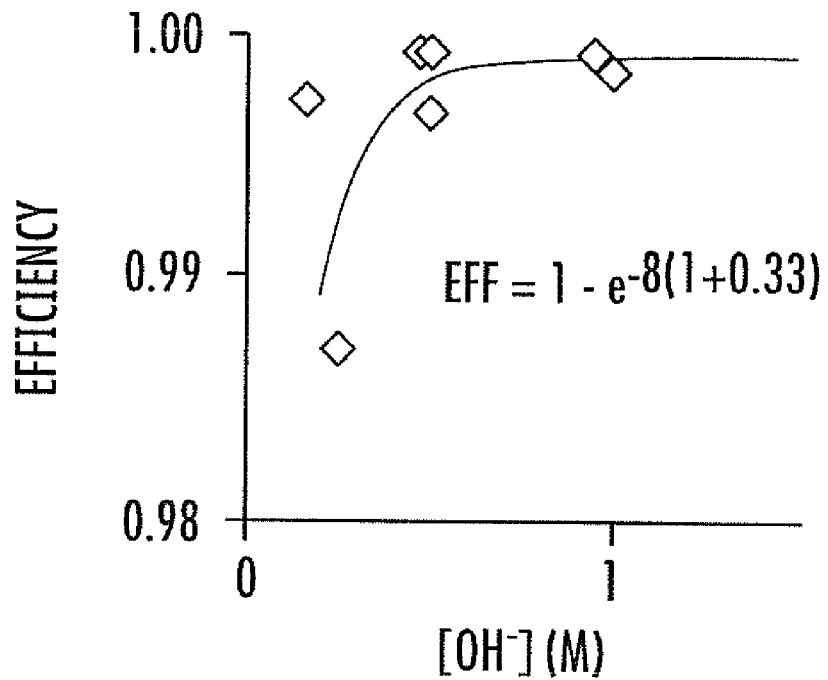
FIG. 2 shows the efficiency of the $CO_2$ scrubber is a function of the [OH⁻] in the scrubbing media described in the Example. While inconsistent results were observed at 0.5 M depending on aeration flow rate, 1.0 M [OH—] is consistently 99.8-99.9% efficient at removing atmospheric $CO_2$ from the air stream. (See, bottom). The breakthrough time is a linear function of the total amount of OH⁻ in the scrubbing media, providing researchers a convenient scaling for different application.
Figure 2:
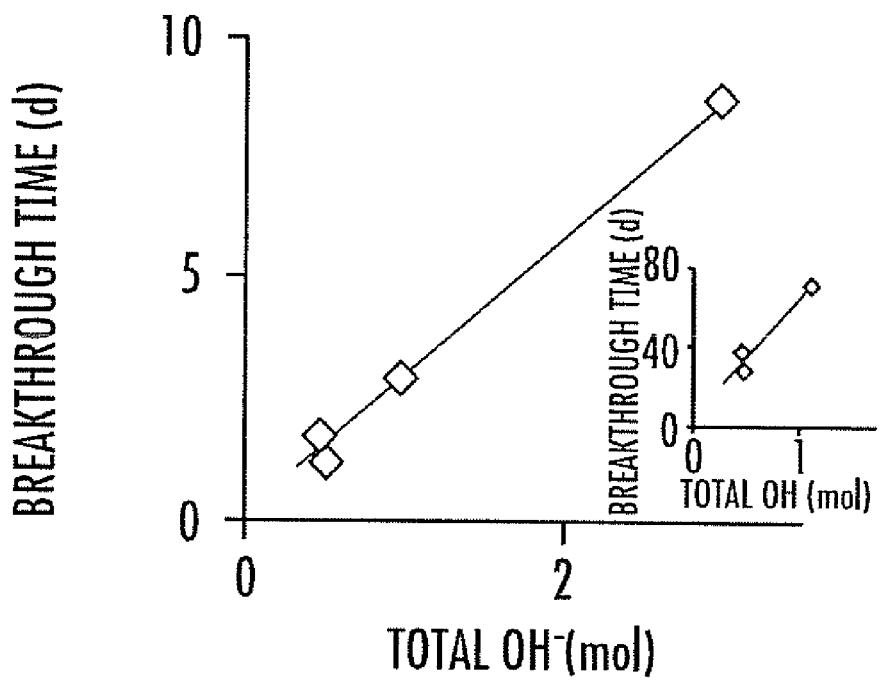

Efficiency is strongly determined by the concentration of caustic in scrubbing media (see, FIG. 2). Efficiencies exceeding 99.8% removal of atmospheric $CO_2$ were observed at [OH$^-$] as low at 0.5 M, however these results were not consistent. $CO_2$ removal was more consistently observed at 1 M [OH$^-$], always achieving 99.8-99.9% removal of atmospheric $CO_2$. Subsequent operation of the $CO_2$ scrubber at 1 M [OH$^-$] consistently proves sufficient to maintain this near complete removal of atmospheric $CO_2$. Higher caustic concentrations are unlikely to make significant improvement on removal efficiency and add undue safety concerns for operators and technicians.

Another factor, drawdown time, is the time for a scrubber to reach peak $CO_2$ removal efficiency after refreshing the caustic media and beginning aeration. Concentration also contributed to the reduction in drawdown times, but a minimum 0.5 M media provided a quick drawdown, less than 60 minutes, to working $CO_2$ removal concentration. Reservoir tank aeration is stopped during this time, and resumed once normal high-efficiency $CO_2$ removal is restored.

Residence time must be an important factor in the scrubber efficiency, and it appears to be interrelated with the caustic concentration. Residence times shorter than 20 seconds were not tested.

Figure 3:
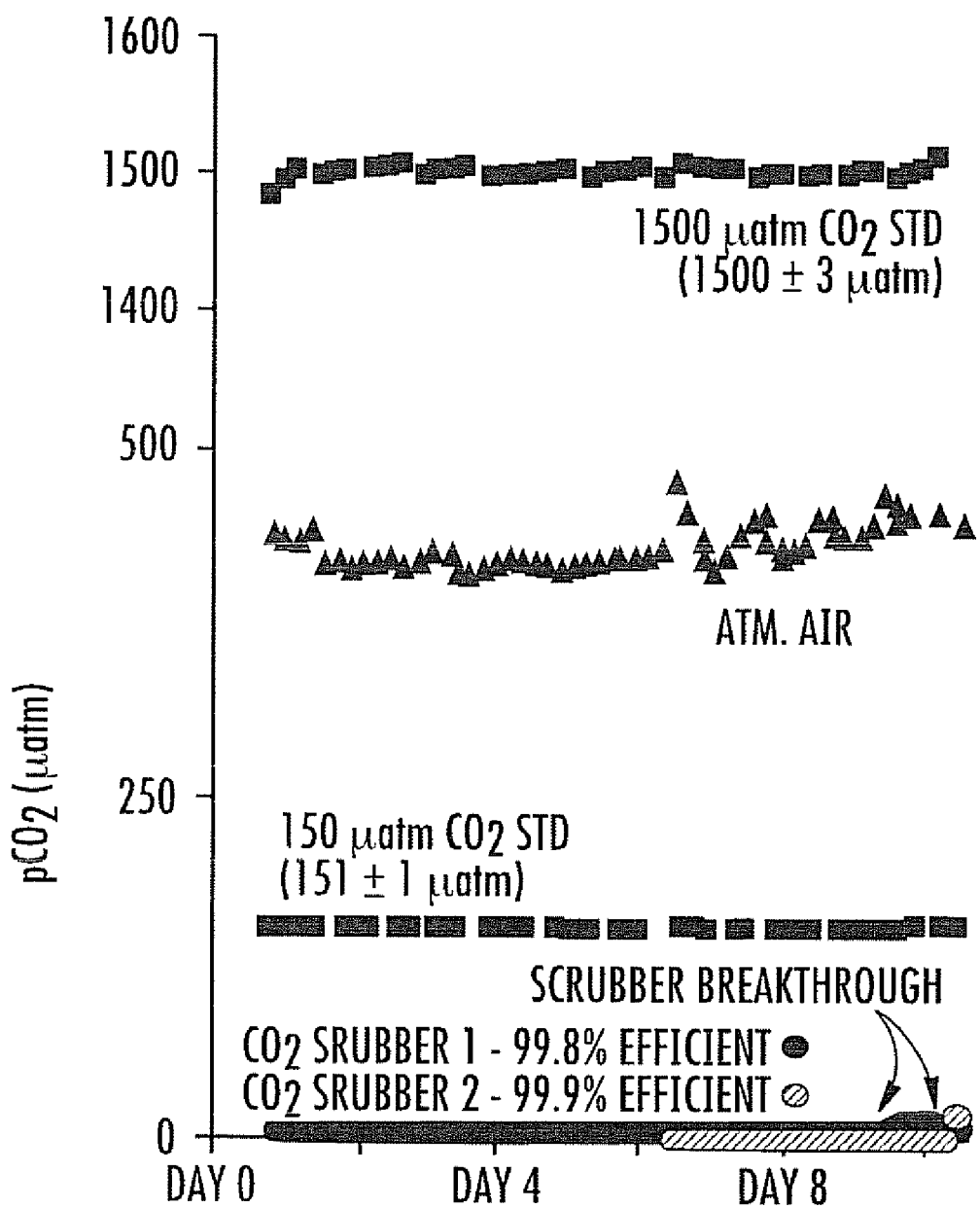
FIG. 3 shows the $pCO_2$ of atmospheric air input, two $CO_2$-free air stream outputs from separate $CO_2$ scrubbing units, and two 2° NIST $CO_2$-in-air standards according to the Example. The caustic scrubbing media has a limited lifetime and breakthrough of atmospheric $CO_2$ occurs when OH⁻ becomes limited in the scrubbing media. The use of NaOH and $Ca(OH)_2$ allows for a relatively slow reduction in efficiency. Insoluble $Ca(OH)_2$ dissolves in response to OH⁻ removal as carbonic acid is neutralized after all NaOH is reacted. This scrubber design maintained complete $CO_2$ removal for 9 days, convenient for weekly changes with a 2-day margin of safety.

Breakthrough time, or the duration that a scrubber performs at its optimal efficiency, is a function of the total caustic in the scrubbing media (see FIGS. 2 and 3). While concentration may have an influence on the efficiency of removal, that removal efficiency will be maintained until the available OH$^-$ is consumed with the carbonic acid neutralization. This is a linear function, thus scaling up the scrubber capacity by an order of magnitude received an order of magnitude longer duration in effective $CO_2$ removal.

Differing mixtures of NaOH and Ca(OH)$_2$ were tested to investigate whether an optimum ratio exists. In each case, NaOH was observed to be a more efficient caustic used to neutralize the carbonic acid. However, through the course of the experimentation, adding a small amount of Ca(OH)$_2$ allowed for a slower reduction in scrubber efficiency once the initial breakthrough of $CO_2$ is observed.

Ca(OH)$_2$ is not as soluble as NaOH. Thus, until OH$^-$ which remains in solution is reacted with carbonic acid, additional Ca(OH)$_2$ will not dissolve. After the initial breakthrough, Ca(OH)$_2$ that is not in solution slowly dissolves as OH$^-$ is utilized, but the kinetics of dissolution limit the efficiency of scrubber. While Ca(OH)$_2$ provides a measure of security in limiting the loss of scrubber efficiency, experimental protocols should ultimately plan to change scrubber media prior to the initial $CO_2$ breakthrough to ensure experimental conditions are maintained. Based on our experimentation the scrubbing media is mixed 95% NaOH: 5% $Ca(OH)_2$ by mole $OH^-$.

TABLE 1

Experimental trials to determine the efficiency of the liquid caustic $CO_2$ scrubbing system. System parameters including residence time of the atmospheric air in the scrubbing media; the flow rate of atmospheric air; volume, concentration ($[OH^-]$), and total amount ($OH^-_T$) of caustic scrubbing media were each varied to identify the key factors that control scrubber efficiency, drawdown and breakthrough of atmospheric $CO_2$.

| Experiment | Residence Time s | Air Flow Rate L min$^{-1}$ | Scrubber Media Volume L | [OH$^-$] M | OH$^-_T$ mol | Efficiency | Draw-down h | Break-through h |
|---|---|---|---|---|---|---|---|---|
| 1 | 20 | 3.0 | 1.07 | 0.94 | 1.01 | 99.9% | | |
| 2 | 20 | 3.0 | 1.04 | 0.47 | 0.49 | 99.9% | 34 | 41 |
| 3 | 40 | 3.0 | 2.02 | 0.25 | 0.51 | 98.7% | 15 | 27 |
| 4 | 40 | 3.0 | 2.01 | 0.50 | 1.00 | 99.9% | 1.0 | 71 |
| 5 | 20 | 6.0 | 2.03 | 0.50 | 1.01 | 99.6% | 0.3 | 72 |
| 6 | 40 | 3.0 | 1.85 | 0.19 | 0.36 | 99.7% | 18 | 21 |
| 7 | 40 | 3.0 | 2.97 | 0.99 | 2.94 | 99.8% | 0.4 | 214 |
| 8 | 40 | 3.0 | 3.04 | 1.09 | 3.31 | 99.9% | | 248 |
| 9 | 40 | 3.0 | 3.02 | 1.02 | 3.08 | 99.9% | | 220 |

A benefit to using the liquid scrubbing media in aquatic applications, as one example, is its consistent production of a 100% relative humidity aeration stream. Independent of atmospheric air source, local weather conditions, compressed or pumped air will be passively changed to 100% relatively humidity at operational temperatures. The scrubbing media, NaOH and $Ca(OH)_2$ in low concentrations, is non-toxic to living organisms. Thus, loss of cultures or organisms utilizing this scrubbing system is remote in the unlikely event of a limited scrubbing media transfer. Further, while fresh scrubbing media is caustic, the concentrations are not acutely toxic to humans, and common laboratory safety practices are adequate to protect researchers and technicians. As the scrubbing media is neutralized by atmospheric $CO_2$, the solution pH will lower until the solution is a near-neutral-pH salt solution, which can be safely disposed without hazardous waste removal or other chemical modification.

Scaling of the scrubber and scrubbing media capacity to remove atmospheric $CO_2$ for up to 9 days permits weekly changes in scrubbing media, with a margin of safety. This weekly change in scrubbing media allows for the indefinite control of seawater $pCO_2$ equilibrium substantially different from ambient atmospheric and laboratory concentrations.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A scrubbing system configured to remove carbon dioxide from a gas, the scrubbing system comprising a scrubber defining a tubing assembly that is vertically oriented, a gas inlet and a gas outlet, where in the tubing assembly comprises a tank section, a reduced diameter section, and an expansion section such that the expansion section is positioned above the reduced diameter section and the reduced diameter section is positioned above the tank section, wherein an aqueous liquid-phase scrubbing media is contained within the tank section such that the gas exits the aqueous liquid-phase scrubbing media in a headspace of the tank section and then passes through the reduced diameter section followed by the expansion section, wherein the scrubber is configured such that the gas is introduced to the aqueous liquid-phase scrubbing media via the gas inlet to allow the aqueous liquid-phase scrubbing media to remove $CO_2$ from the gas forming a $CO_2$-free gas, and wherein the scrubber is configured such the $CO_2$-free gas exits the scrubber via the gas outlet.

2. The scrubbing system of claim 1, wherein the aqueous liquid-phase scrubbing media comprises a caustic metallic base.

3. The scrubbing system of claim 2, wherein the caustic metallic base is selected from the group of sodium hydroxide, calcium hydroxide, potassium hydroxide, barium hydroxide, cesium hydroxide, strontium hydroxide, lithium hydroxide, rubidium hydroxide, magnesium hydroxide, and mixtures and combinations thereof.

4. The scrubbing system of claim 1, wherein the aqueous liquid-phase scrubbing media comprises sodium hydroxide.

5. The scrubbing system of claim 1, wherein the aqueous liquid-phase scrubbing media occupies from about 50% to about 95% of the tank section measured by height.

6. The scrubbing system of claim 1, wherein the reduced diameter section has a diameter that is less than 90% of the diameter of the tank section and/or the expansion section.

7. The scrubbing system of claim 1, wherein the reduced diameter section has a diameter that is from about 25% to about 75% of the diameter of the tank section and/or the expansion section.

8. The scrubbing system of claim 1, wherein the gas inlet comprises an air stone configured to increase contact of the gas with the aqueous liquid-phase scrubbing media.

9. The scrubbing system of claim 1 further comprising a water bath configured to receive the $CO_2$-free gas exiting the scrubber.

10. The scrubbing system of claim 9, wherein the water bath comprises deionized water.

11. The scrubbing system of claim 9 further comprising a pipe carrying the $CO_2$-free gas from the gas outlet of the scrubber to the water bath.

12. The scrubbing system of claim 1, wherein the headspace defined within the tank section above the aqueous liquid-phase scrubbing media has a pressure of from about 100 kPa to about 500 kPa.

13. A method for removing carbon dioxide from a gas, the method comprising:
- introducing the gas to a scrubbing system via a gas inlet, wherein the gas passes through the gas inlet and into a tubing assembly containing an aqueous liquid-phase scrubbing media in a tank section;
- bubbling the gas through the aqueous liquid-phase scrubbing media to form a $CO_2$-free gas in a headspace defined in the tank section;
- passing the $CO_2$-free gas exiting the aqueous liquid-phase scrubbing media in the headspace of the tank section out of the tank section and into a reduced diameter section;
- passing the $CO_2$-free gas through the reduced diameter section and into an expansion section; and
- removing the $CO_2$-free gas from the scrubber via the gas outlet.

14. The method of claim 13 further comprising
- piping the $CO_2$-free gas from the gas outlet to a water bath, and
- bubbling the $CO_2$-free gas through the water bath.

15. The method of claim 13, wherein the aqueous liquid-phase scrubbing media comprises a caustic metallic base selected from the group of sodium hydroxide, calcium hydroxide, potassium hydroxide, barium hydroxide, caesium hydroxide, strontium hydroxide, lithium hydroxide, rubidium hydroxide, magnesium hydroxide, and mixtures and combinations thereof.

16. The method of claim 13, wherein the aqueous liquid-phase scrubbing media occupies from about 50% to about 95% of the tank section measured by height.

17. The method of claim 13, wherein the reduced diameter section has a diameter that is less than 90% of the diameter of the tank section and/or the expansion section.

18. The method of claim 13 further comprising
- passing the gas through an air stone configured to increase contact of the gas with the aqueous liquid-phase scrubbing media prior to bubbling the gas through the aqueous liquid-phase scrubbing media.

19. The method of claim 13, wherein the gas comprises atmospheric air.

20. The scrubbing system of claim 1, wherein the aqueous liquid-phase scrubbing media occupies from about 30% to about 75% of the tank section measured by height.

21. The method of claim 13, wherein the headspace defined within the tank section above the aqueous liquid-phase scrubbing media has a pressure of from about 100 kPa to about 500 kPa.

22. The method of claim 13, wherein the aqueous liquid-phase scrubbing media occupies from about 30% to about 75% of the tank section measured by height.

23. The method of claim 14, wherein bubbling the $CO_2$-free gas through the water bath removes entrained scrubbing media from the $CO_2$-free gas.

* * * * *